(12) United States Patent
Yamamoto et al.

(10) Patent No.: US 10,774,911 B2
(45) Date of Patent: Sep. 15, 2020

(54) AXLE DRIVING DEVICE

(71) Applicant: HONDA MOTOR CO., LTD., Tokyo (JP)

(72) Inventors: Eriko Yamamoto, Wako (JP); Takahiro Kasahara, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/275,697

(22) Filed: Feb. 14, 2019

(65) Prior Publication Data
US 2019/0293159 A1 Sep. 26, 2019

(30) Foreign Application Priority Data

Mar. 22, 2018 (JP) ................................. 2018-055042

(51) Int. Cl.
*F16H 48/11* (2012.01)
*F16H 57/04* (2010.01)
*F16H 48/10* (2012.01)

(52) U.S. Cl.
CPC ......... *F16H 48/11* (2013.01); *F16H 57/0479* (2013.01); *F16H 57/0483* (2013.01); *F16H 2048/104* (2013.01)

(58) Field of Classification Search
CPC ............... F16H 48/11; F16H 2048/104; F16H 2048/108; F16H 57/0479; F16H 57/0483; F16H 57/082; F16H 37/082; F16H 37/0813
See application file for complete search history.

(56) References Cited

U.S. PATENT DOCUMENTS

| | | | | |
|---|---|---|---|---|
| 2006/0293143 | A1* | 12/2006 | Cho | F16H 3/663 475/339 |
| 2011/0252906 | A1* | 10/2011 | Harashima | F04C 2/10 74/325 |
| 2016/0252171 | A1* | 9/2016 | Hederstad | B60K 17/165 475/204 |
| 2017/0313172 | A1* | 11/2017 | Meixner | B60K 6/365 |

FOREIGN PATENT DOCUMENTS

JP 2009-036365 2/2009

* cited by examiner

*Primary Examiner* — Huan Le
(74) *Attorney, Agent, or Firm* — Rankin, Hill & Clark LLP (57) ABSTRACT

To provide a variable axle driving device which can obtain a high deceleration ratio, and which can prevent noise from being easily generated. Provided is an axle driving device which includes a planet gear mechanism. The planet gear mechanism includes first planetary gears, second planetary gears, first stepped gears, and second stepped gears. A driving force is input into a larger gear of each first stepped gear. A smaller gear of each first stepped gear is meshed with a larger gear of each second stepped gear. A smaller gear of each second stepped gear is connected to a first internal gear via the first planetary gear. A larger gear of each second stepped gear is connected to a second internal gear via a second planetary gear.

8 Claims, 10 Drawing Sheets

AXLE DRIVING DEVICE

CROSS-REFERENCE TO RELATED APPLICATION

The present application claims priority under 35 U.S.C. § 119 to Japanese Patent Application No. 2018-055042 filed on Mar. 22, 2018, the entire contents of which are hereby incorporated by reference.

BACKGROUND OF THE INVENTION

Field of the Invention

The present disclosure relates to an axle driving device.

Description of the Related Art

Among axle driving devices using electric motors, one is known in which motive power of the electric motor is decelerated with a deceleration mechanism and is then transmitted to an output shaft. There is known a planet gear mechanism that is formed by stacking a plurality of planet gear units so as to obtain a high deceleration ratio.

Further, as illustrated in Japanese Patent Laid-Open No. 2009-36365, a device using a two-stage gear for the planet gear mechanism is known.

In changing a deceleration ratio, a transmission mechanism is connected to the planet gear mechanism so as to change the deceleration ratio of the driving force.

In the case of changing a deceleration ratio in the planet gear mechanism, a method is adopted where planetary gears are prevented from rotating with respect to a carrier so as to change the deceleration ratio.

SUMMARY OF THE INVENTION

However, the configuration of connecting the transmission mechanism to the planet gear mechanism increases the axle driving device in size so that it becomes difficult to compactly constitute the axle driving device.

Further, the configuration of changing a deceleration ratio in the planet gear mechanism makes the mechanism further complicated so that the number of constitutional components is increased, thus increasing labor required for assembly.

The mechanism disclosed in Japanese Patent Laid-Open No. 2009-36365 is not configured to allow a deceleration ratio of driving force to be changed and hence, the mechanism has no space for mounting a mechanism which changes a deceleration ratio. Accordingly, it is difficult to utilize the mechanism disclosed in Japanese Patent Laid-Open No. 2009-36365 as a planet gear mechanism which can change a deceleration ratio.

In addition, the conventional variable speed planet gear mechanism is complex, and for supplying lubricating oil to the gear in such a complex planet gear mechanism, a further complex configuration is required. Hence the configuration to cool the gear of the planet gear mechanism with lubricating oil becomes complex, and a lot of labor is required for the assembly.

In view of the conventional disadvantage described above, it is an object of the present disclosure to provide an axle driving device capable of changing a deceleration ratio while obtaining a high deceleration ratio.

It is also an object of the present disclosure to provide an axle driving device that reduces noise during operation and has high ease of assembly and coolability.

The present disclosure provides an axle driving device including a planet gear mechanism configured to transmit a driving force to a first axle and a second axle via a differential mechanism. The planet gear mechanism includes a first planetary gear, a second planetary gear, a first stepped gear, and a second stepped gear, each of the first stepped gear and the second stepped gear being formed of a planetary gear where a larger gear and a smaller gear are integrally provided. A driving force is input into the larger gear of the first stepped gear. The smaller gear of the first stepped gear is meshed with the larger gear of the second stepped gear. The smaller gear of the second stepped gear is connected to a first internal gear via the first planetary gear. The larger gear of the second stepped gear is connected to a second internal gear via the second planetary gear.

With such a configuration, a driving force is output via the first internal gear or the second internal gear and hence, a deceleration ratio is selectable.

The present disclosure may be configured such that the smaller gear of the second stepped gear is disposed on a larger gear side of the first stepped gear so as to cause transmission of a driving force to turn back in a direction of a rotary shaft.

With such a configuration, it is possible to form the axle driving device with the compact configuration in the extending direction of a support shaft of the gear.

The present disclosure may further include an engagement unit configured to be selectively engaged with the first internal gear or the second internal gear, thus fixing the first internal gear or the second internal gear to an axle driving device body.

With such a configuration, a deceleration ratio can be changed over.

The present disclosure may also be configured such that an oil passage is provided to a support member which holds support shafts respectively supporting the first planetary gear, the second planetary gear, the first stepped gear, and the second stepped gear, the oil passage is provided on a side opposite to a side where the support shafts are disposed, and the oil passage of the support member and an oil passage in each of the support shafts are connected with each other.

With such a configuration, lubricating oil is supplied to the planetary gear via the support member of the planetary gear and hence, lubrication can be obtained and, at the same time, the planetary gear can be cooled.

Advantageous Effects of Invention

With the axle driving device according to the present disclosure, it is possible to provide the axle driving device which has a compact configuration, which can obtain a high deceleration ratio, and which can change the deceleration ratio. It is also possible to provide the axle driving device which allows greater ease of assembly, and which cools the planetary gear with lubricating oil.

DETAILED DESCRIPTION OF THE PREFERRED EMBODIMENTS

Hereinafter, an embodiment of the present disclosure will be described with reference to the drawings.

An axle driving device 1 according to the embodiment of the present disclosure will be described with reference to FIGS. 1 to 10.

Figure 1:
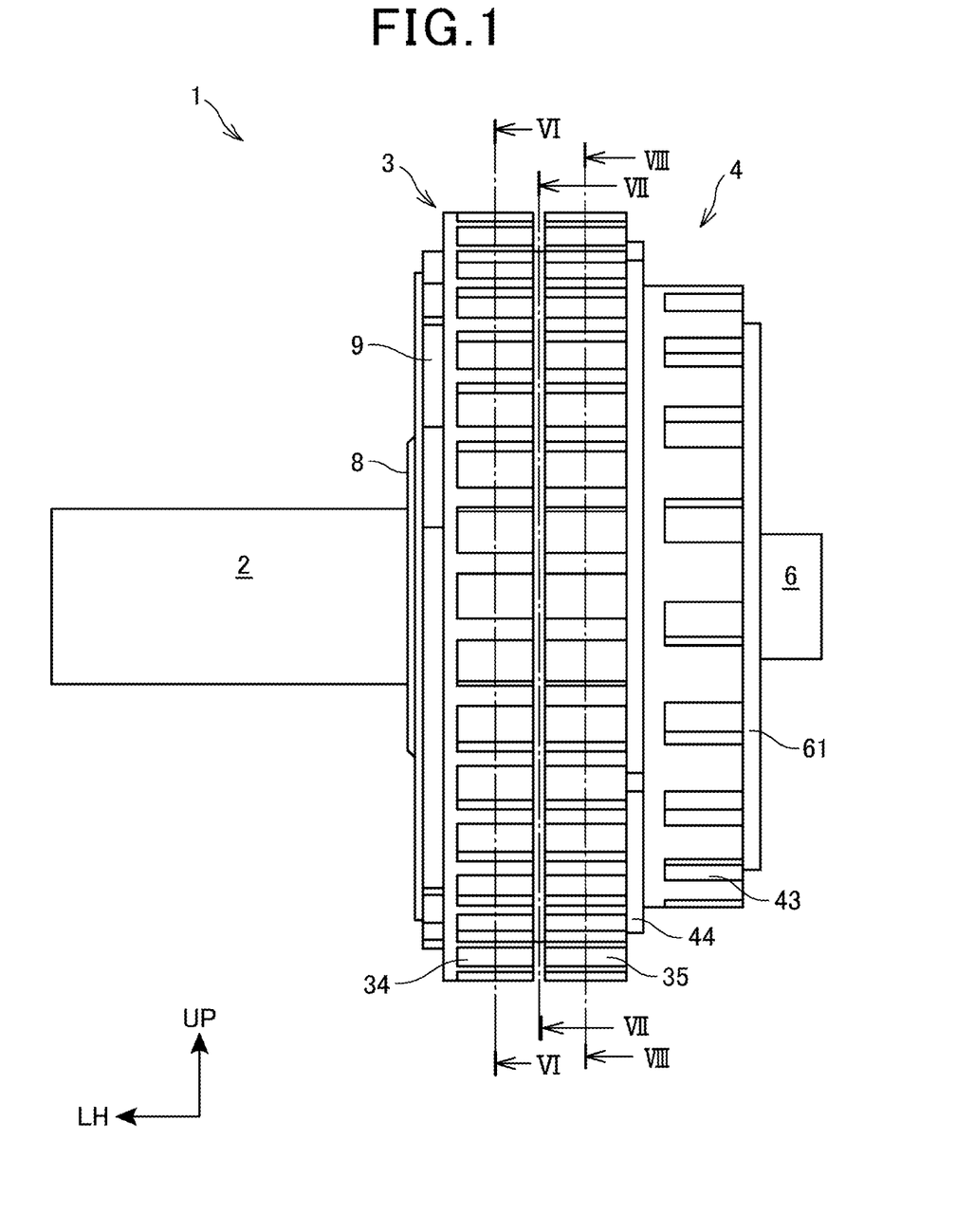
FIG. 1 is a front view illustrating an axle driving device according to the present disclosure.
Figure 2:
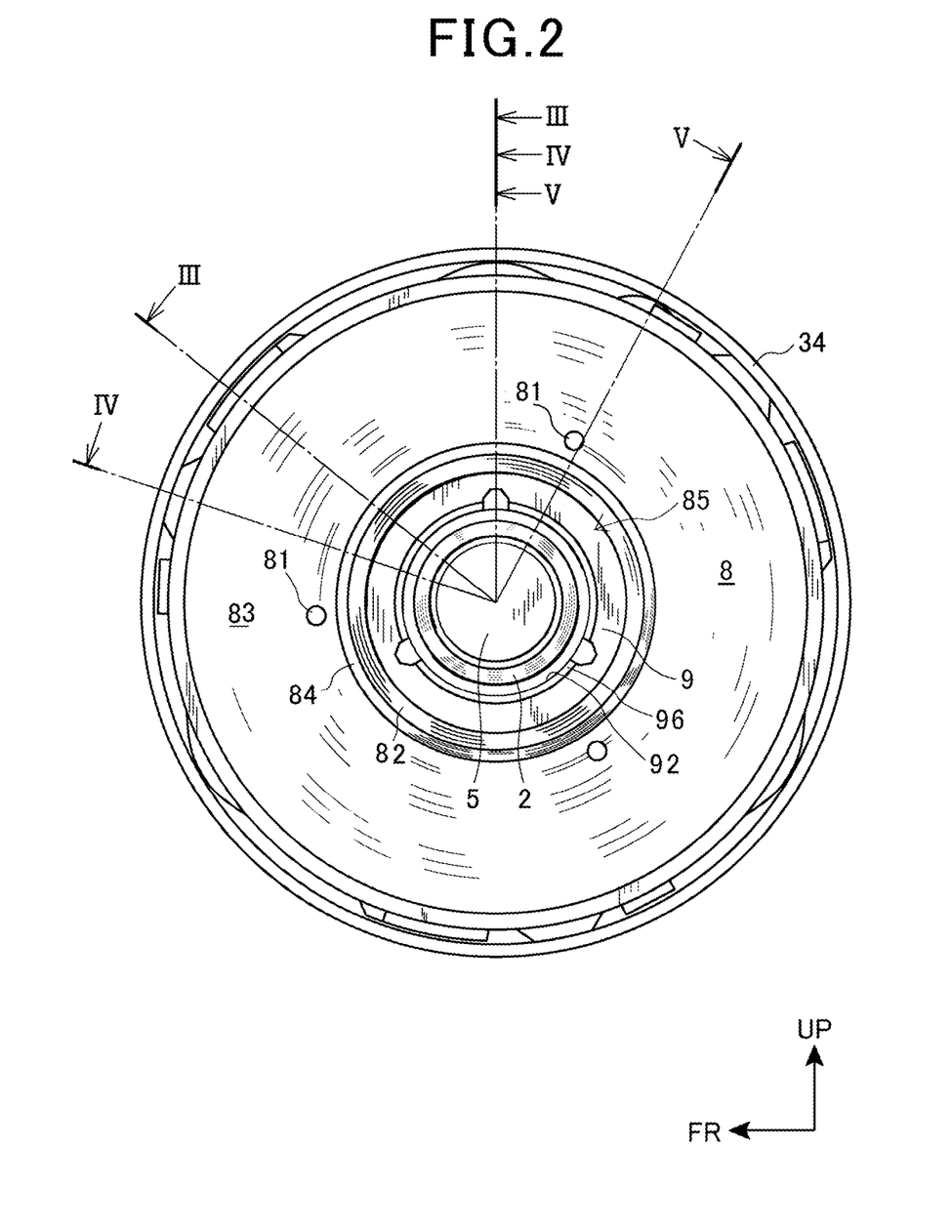
FIG. 2 is a left side view of the axle driving device.
Figure 3:
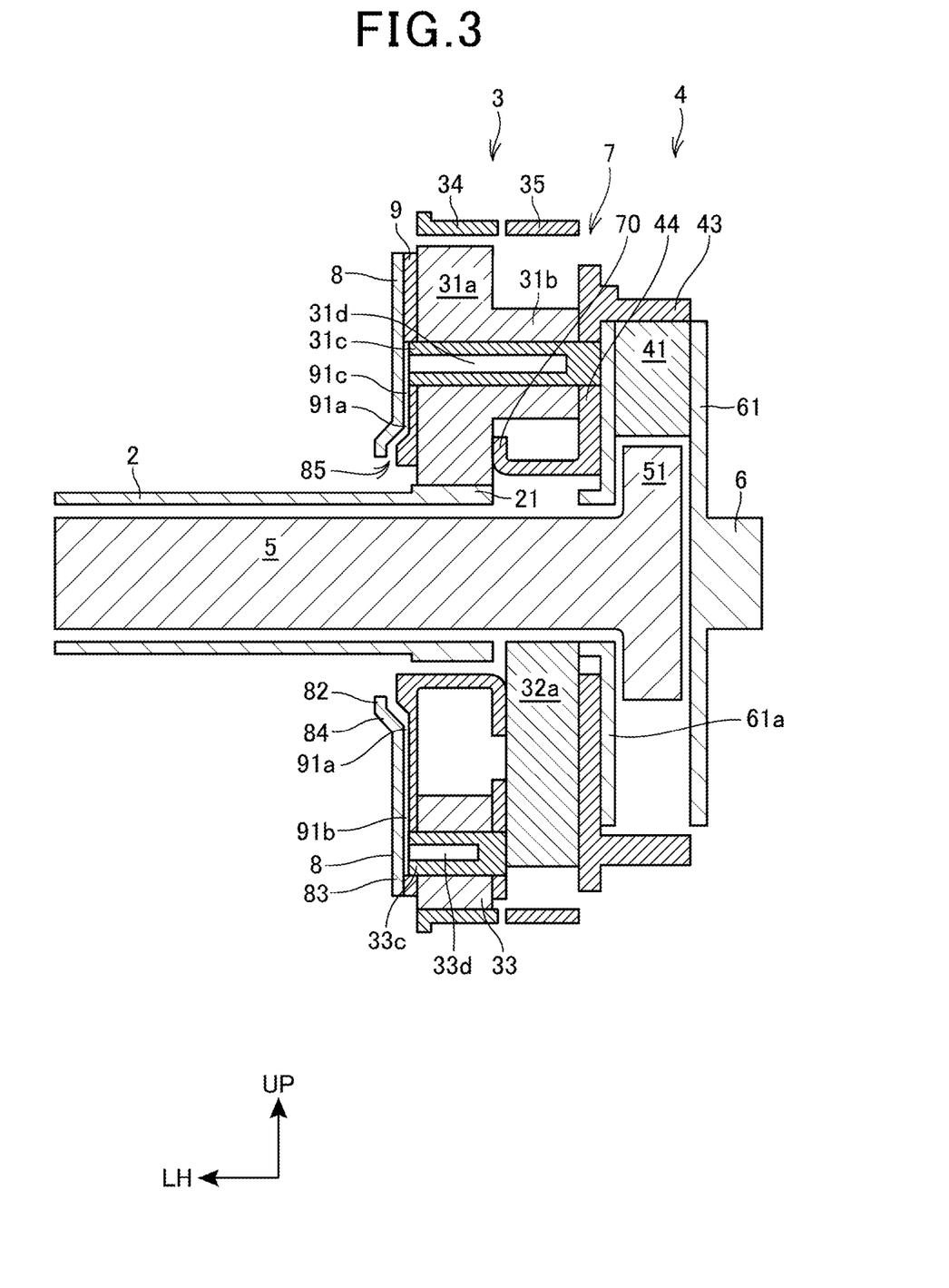
FIG. 3 is a sectional view along a line III-III in FIG. 2.
Figure 4:
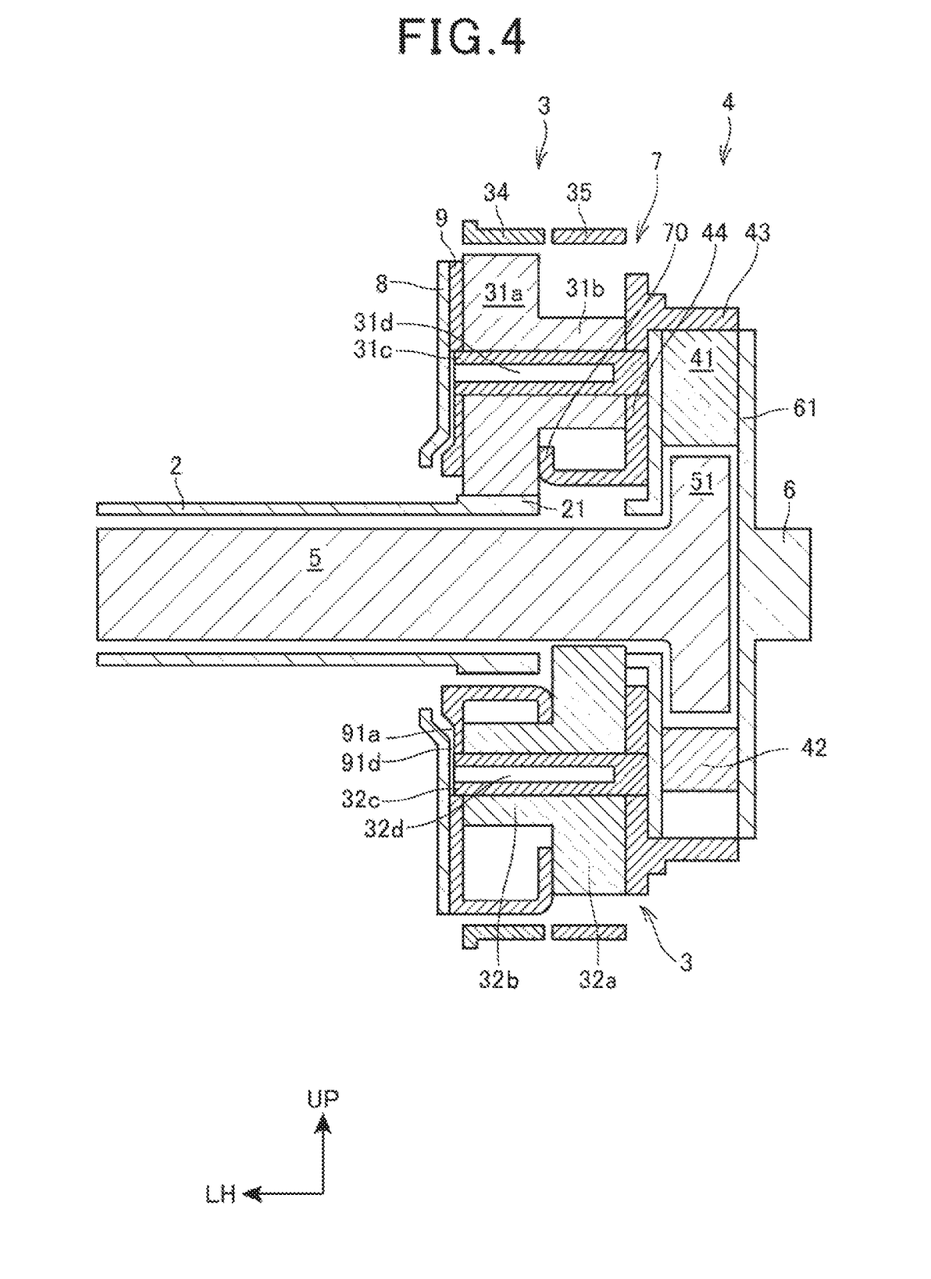
FIG. 4 is a sectional view along a line IV-IV in FIG. 2.
Figure 5:
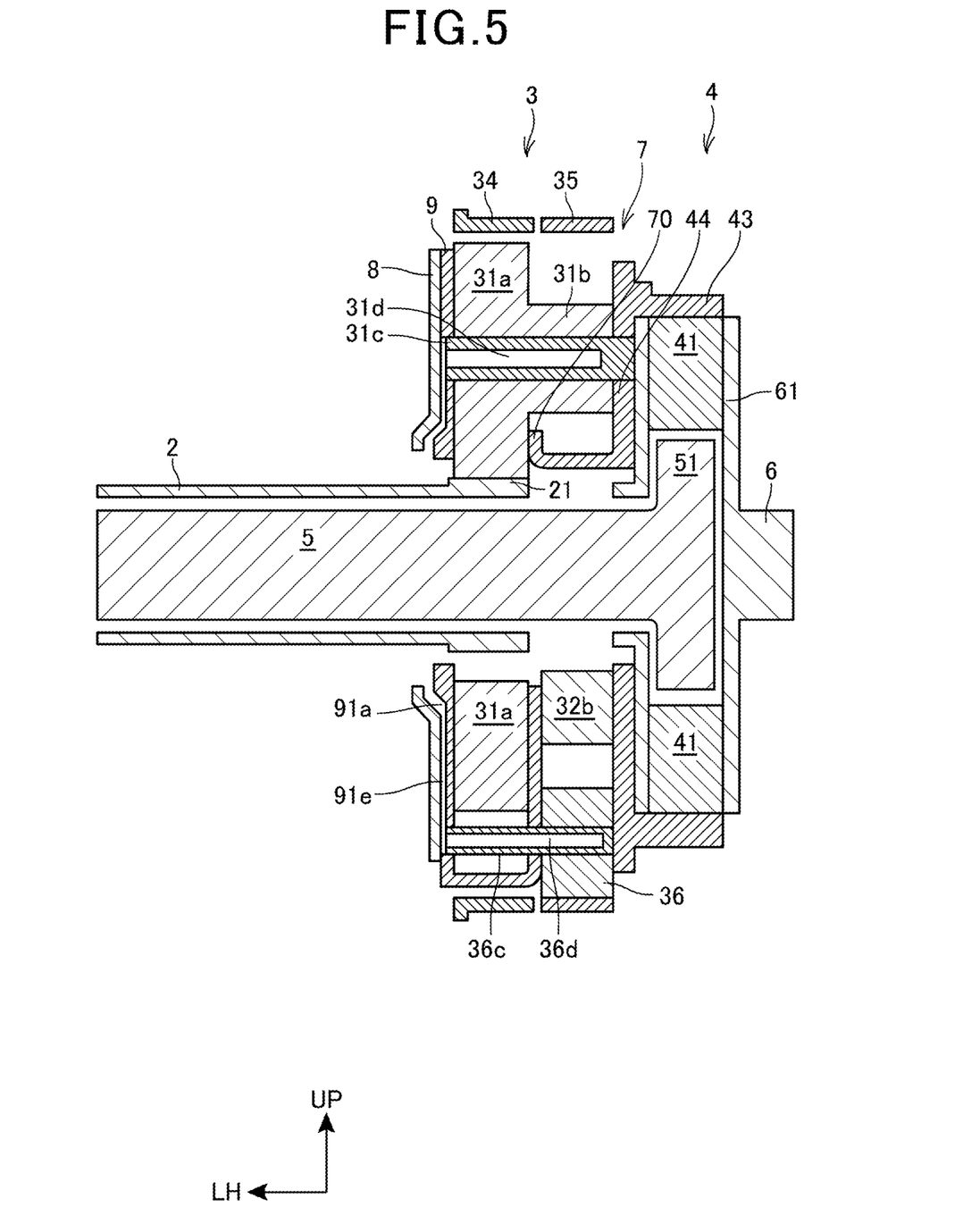
FIG. 5 is a sectional view along a line V-V in FIG. 2.
Figure 6:
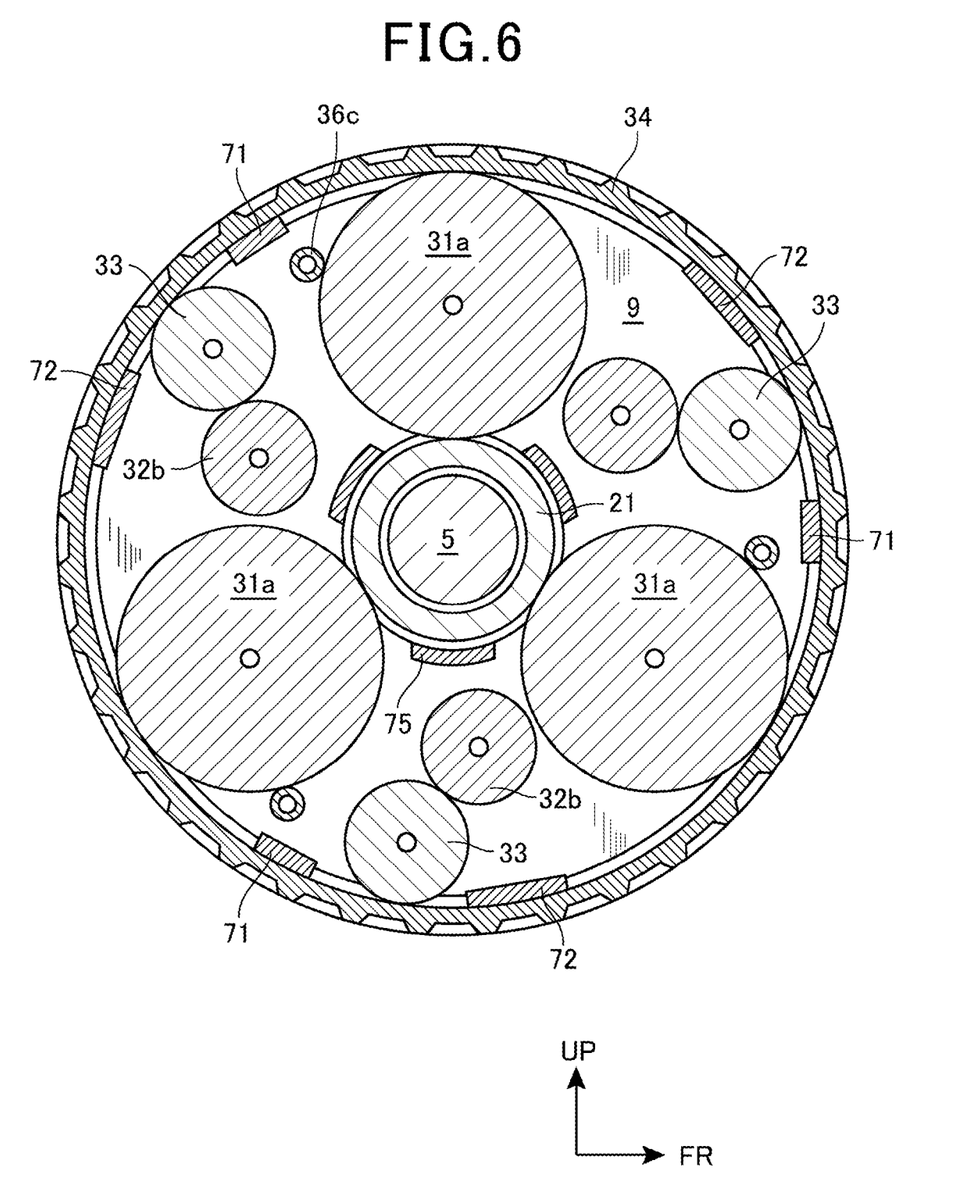
FIG. 6 is a sectional view along a line VI-VI in FIG. 1.

FIG. 1 is a front view illustrating an axle driving device according to the present disclosure, and FIG. 2 is a left side view of the axle driving device. FIG. 3 is a sectional view along a line III-III in FIG. 2, and FIG. 4 is a sectional view along a line IV-IV in FIG. 2. FIG. 5 is a sectional view along a line V-V in FIG. 2, and FIG. 6 is a sectional view along a line IV-IV in FIG. 1.

Figure 7:
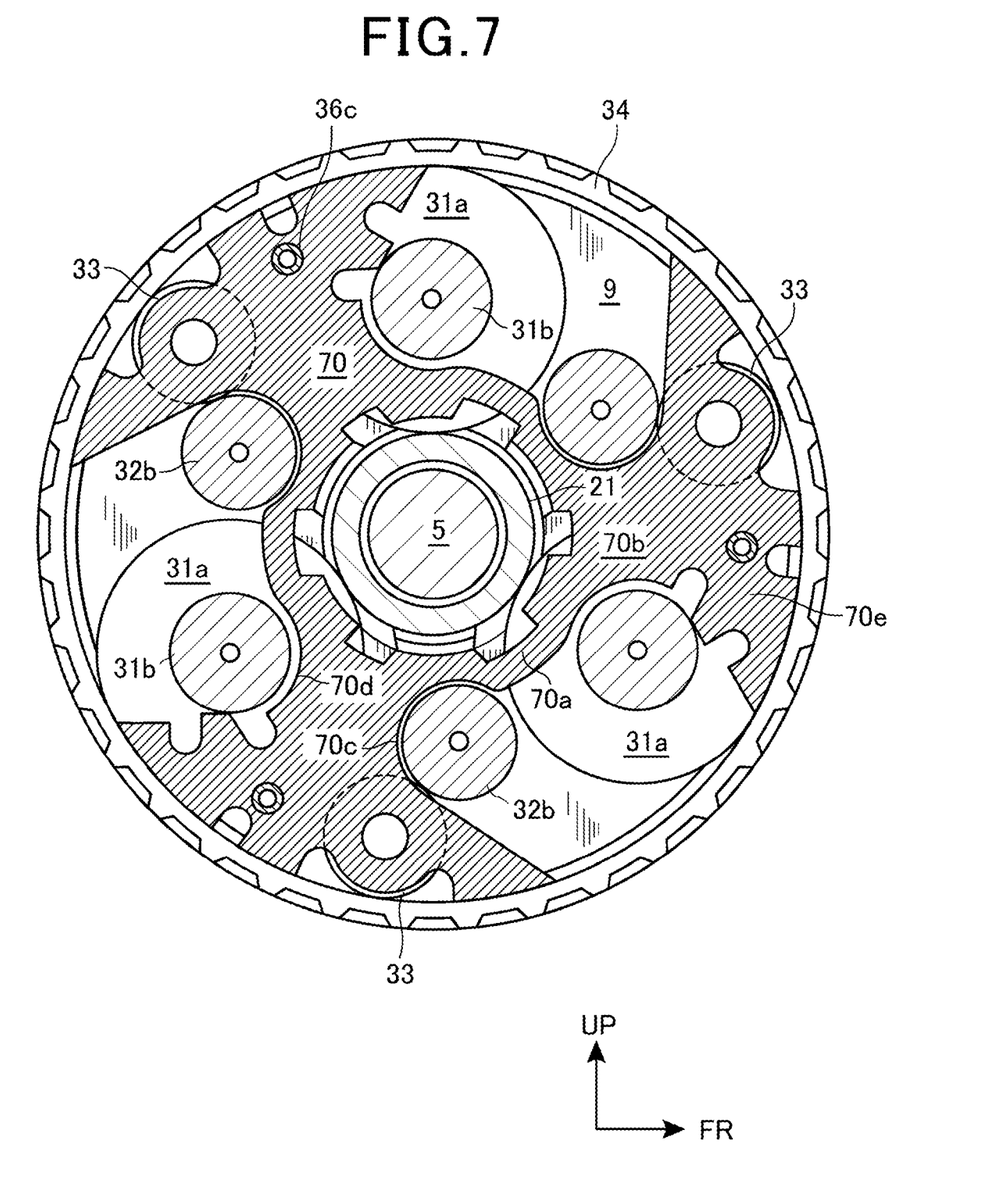
FIG. 7 is a sectional view along a line VII-VII in FIG. 1.
Figure 8:
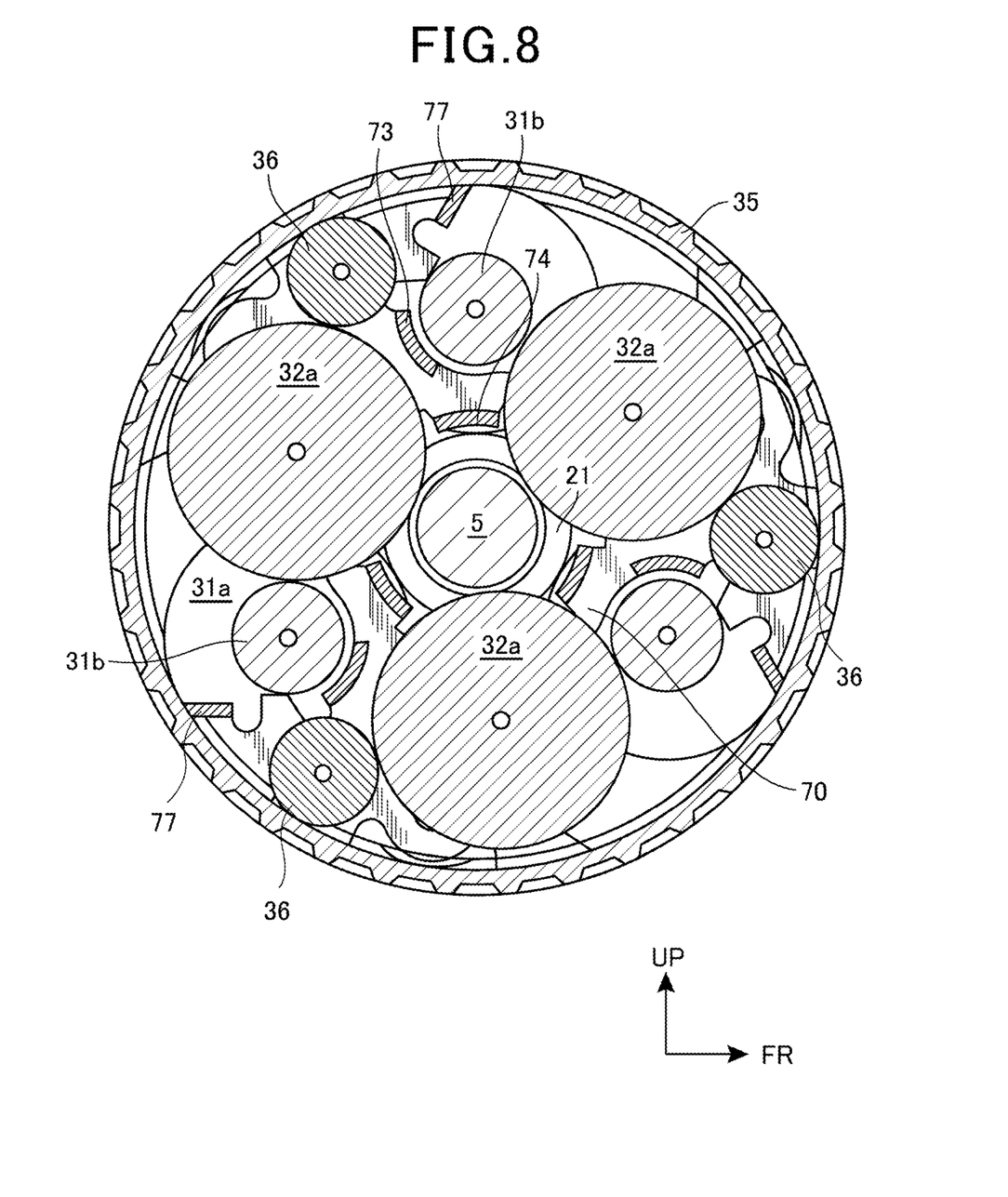
FIG. 8 is a sectional view along a line VIII-VIII in FIG. 1.
Figure 9:
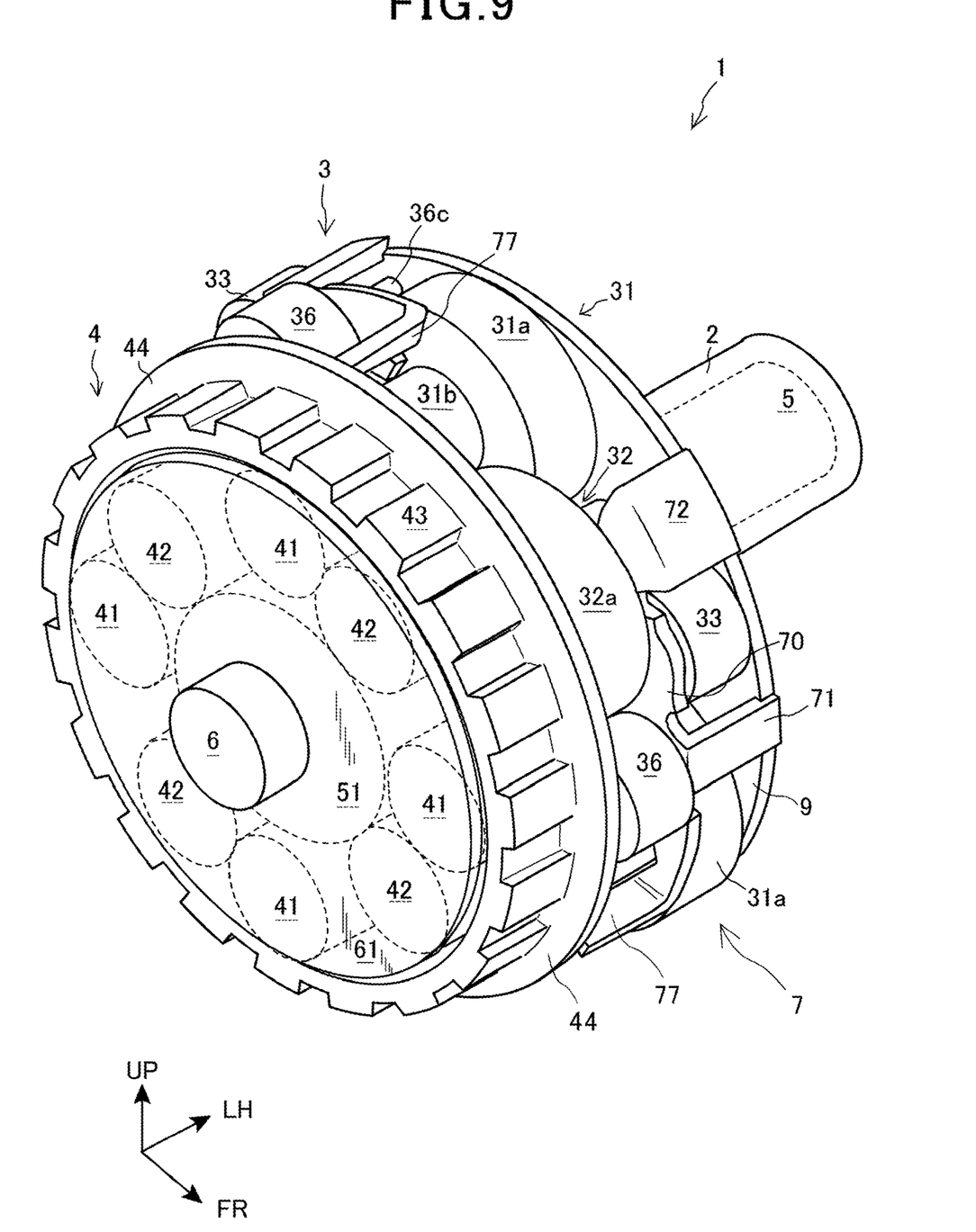
FIG. 9 is a perspective view illustrating the right side of the axle driving device.
Figure 10:
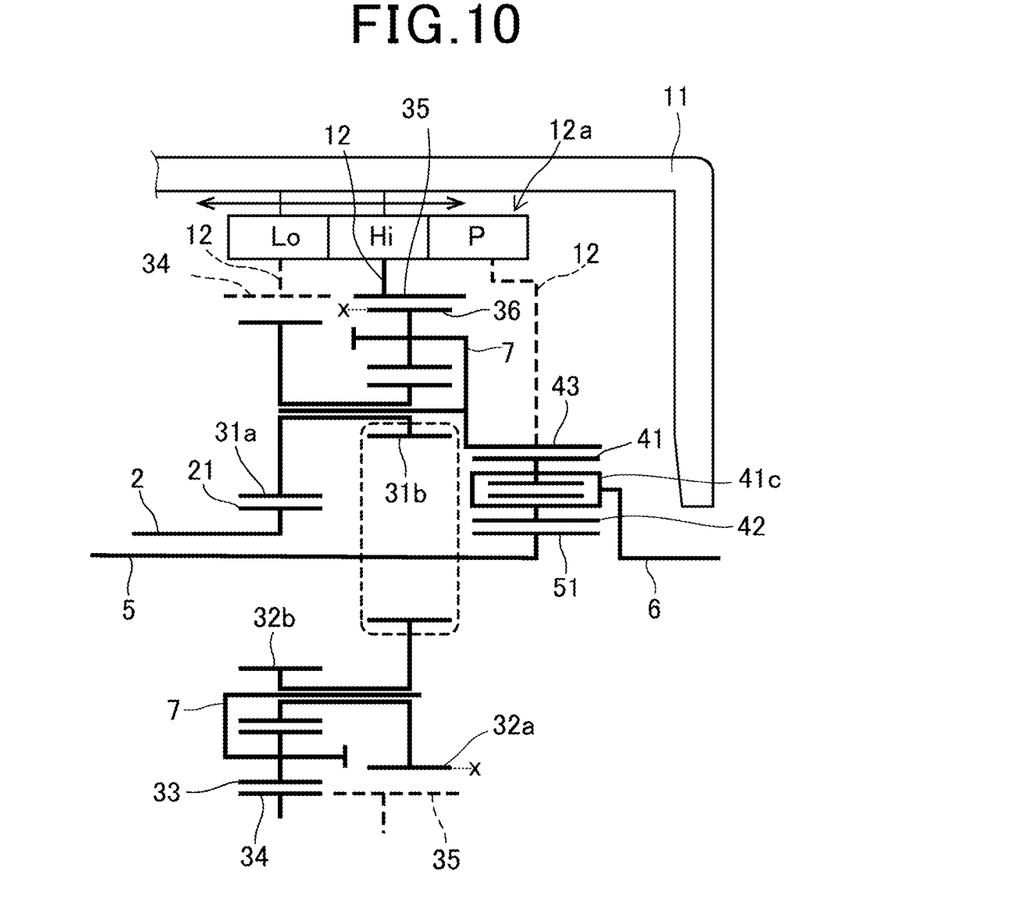
FIG. 10 is a skeleton view illustrating a configuration of the axle driving device.

FIG. 7 is a sectional view along a line VII-VII in FIG. 1, and FIG. 8 is a sectional view along a line VIII-VIII in FIG. 1. FIG. 9 is a perspective view illustrating the right side of the axle driving device, and FIG. 10 is a skeleton view illustrating a configuration of the axle driving device.

Note that symbols FR in each drawing denotes the front side of a vehicle body, symbol UP denotes the upper side of the vehicle body, and symbol LH denotes the left side of the vehicle body.

The axle driving device 1 is covered with a housing case 11 and attached to the vehicle, and receives input of a driving force from an electric motor (not illustrated).

The axle driving device 1 includes a planet gear mechanism 3, which is a planetary deceleration mechanism, and a differential mechanism 4 and is connected to a first axle 5 on the left side and connected with a second axle 6 on the right side. For a gear of each of the planet gear mechanism 3 and the differential mechanism 4, a gear that transmits a driving force between parallel shafts is used, and a spur gear or a helical gear can be used.

A motor driving shaft 2 being a driving-force input shaft is connected to the axle driving device 1, and a driving force is input into the axle driving device 1.

The driving force input from the motor driving shaft 2 is decelerated by the planet gear mechanism 3 and is output to the first axle 5 and the second axle 6 via the differential mechanism 4.

Note that a first ring gear 34 and a second ring gear 35, which are internal gears, are provided in the planet gear mechanism 3 of the axle driving device 1. The first ring gear 34 and the second ring gear 35 are fixable by an engagement unit 12 to the housing case 11 that covers the axle driving device 1. Hence the first ring gear 34 or the second ring gear 35 is fixable to the body of the axle driving device 1.

Fixing of either the first ring gear 34 or the second ring gear 35 enables a change in deceleration ratio of the driving force that is output to the differential mechanism 4.

Further, the differential mechanism 4 can also be fixed by the engagement unit 12 to the housing case 11 covering the axle driving device 1, and fixed to the body of the axle driving device 1. When the differential mechanism 4 is fixed, the driving force is not transmitted from the motor driving shaft 2 to the first axle 5 or the second axle 6.

As illustrated in FIGS. 2 and 3, the motor driving shaft 2 is a horizontally extending hollow shaft, on the inside of which, the first axle 5 is inserted. A rotor of the electric motor can be attached to the outer peripheral surface of the motor driving shaft 2. It is thereby possible to drive the motor driving shaft 2 directly and output the driving force from the first axle 5 provided through the motor driving shaft 2.

Note that the driving force can also be input into the motor driving shaft 2 by another configuration of the input via a gear, a belt, or the like.

Next, the internal configuration of the axle driving device 1 will be specifically described with reference to FIGS. 3 to 8.

The axle driving device 1 includes the planet gear mechanism 3. The planet gear mechanism 3 is made up of a sun gear 21 provided at one end of the motor driving shaft 2, a first stepped pinion 31, a second stepped pinion 32, a first outer pinion 33, a first ring gear 34, a second outer pinion 36, a second ring gear 35, and a carrier 7.

The first stepped pinion 31, the second stepped pinion 32, the first outer pinion 33, and the second outer pinion 36 are planetary gears.

Three each of the first stepped pinions 31, the second stepped pinions 32, the first outer pinions 33, and the second outer pinions 36 are arranged at equal intervals around the motor driving shaft 2.

Further, the carrier 7 is made up of a side plate 9 and a differential case 44 which are integrally fixed via a base plate 70 and stays. As illustrated in FIG. 2, a cover plate 8 is attached to the side plate 9 with three fastening points 81.

Note that the stays are made up of three each of first stays 71, second stays 72, third stays 73, fourth stays 74, fifth stays 75, and sixth stays 77.

The carrier 7 turnably supports the first stepped pinion 31, the second stepped pinion 32, the first outer pinion 33, and the second outer pinion 36. Then, rotary shafts of the first stepped pinion 31, the second stepped pinion 32, the first outer pinion 33, and the second outer pinion 36 are arranged parallel to the motor driving shaft 2.

As illustrated in FIGS. 2 and 6, the sun gear 21 is a gear with its teeth facing the outside of the motor driving shaft 2, and rotates integrally with the motor driving shaft 2. The sun gear 21 meshes with a large gear 31*a* of the first stepped pinion 31.

The first stepped pinion 31 includes the large gear 31*a* and a small gear 31*b* that rotate integrally. The first stepped pinion 31 is rotatably supported by a support shaft 31*c* supported by the side plate 9 and the differential case 44.

When a driving force is transmitted from the sun gear 21, the large gear 31*a* of the first stepped pinion 31 rotates integrally with the small gear 31*b*. The driving force is then transmitted from the small gear 31*b* to a large gear 32*a* of the second stepped pinion 32.

Note that the large gear 31*a* of the first stepped pinion 31 is disposed on the left side which is the side plate 9 side, and the small gear 31*b* is disposed on the right side which is the differential case 44 side.

As illustrated in FIG. 8, the large gear 32*a* of the second stepped pinion 32 meshes with the second outer pinion 36. The second outer pinion 36 is disposed between the base plate 70 and the differential case 44. The second outer pinion 36 meshes with internal teeth of the second ring gear 35 inside the second ring gear 35.

Note that the second outer pinion 36 is disposed in a position where the second outer pinion 36 overlaps with the large gear 31a of the first stepped pinion 31 in a horizontal view of the axle driving device 1.

A support shaft 36c of the second outer pinion 36 is provided through the base plate 70 and has the ends respectively supported by the side plate 9 and the differential case 44. The second outer pinion 36 is rotatably supported by the support shaft 36c.

Thereby, the driving force input into the first stepped pinion 31 is transmitted to the second outer pinion 36 via the second stepped pinion 32.

In the second ring gear 35 meshing with the second outer pinion 36, the engagement unit 12 is provided so as to be engageable with the second ring gear 35. The engagement unit 12 is also provided so as to be engageable with the first ring gear 34 and the ring gear 43 of the differential mechanism 4. As illustrated in FIG. 10, the engagement unit 12 is provided movably in the direction of the rotary shaft of the second ring gear 35 in the housing case 11. The engagement unit 12 is positioned at a position Lo, Hi, or P by using a position selection unit 12a.

The engagement unit 12 is engaged with the second ring gear 35 when positioned at the position Hi, and the engagement unit 12 is engaged with the first ring gear 34 when positioned at the position Lo.

The engagement unit 12 is engaged with the ring gear 43 when positioned at the position P.

Note that the engagement unit 12 is only movable in the direction of the rotary shaft of the second ring gear 35. When engaged with the engagement unit 12, the first ring gear 34, the second ring gear 35, and the ring gear 43 are fixed to the housing case 11.

As illustrated in FIGS. 4 and 8, the second stepped pinion 32 is made up of the large gear 32a and a small gear 32b that integrally rotate, and the second stepped pinion 32 meshes with the first stepped pinion 31 via the large gear 32a.

The second stepped pinion 32 is rotatably supported by a support shaft 32c supported by the side plate 9 and the differential case 44. Note that the large gear 32a of the second stepped pinion 32 is disposed on the differential case 44 side, and the small gear 32b is disposed on the side plate 9 side.

As illustrated in FIGS. 3 and 6, the small gear 32b of the second stepped pinion 32 meshes with the first outer pinion 33. The first outer pinion 33 is disposed between the side plate 9 and the base plate 70.

A support shaft 33c of the first outer pinion 33 has ends supported by the side plate 9 and the base plate 70, and the first outer pinion 33 is supported rotatably.

As illustrated in FIG. 3, the support shaft 33c of the first outer pinion 33 is disposed in a position where the support shaft 33c overlaps with the large gear 32a of the second stepped pinion 32 in the horizontal view of the axle driving device 1.

Note that the base plate 70 is disposed between the side plate 9 and the differential case 44. The base plate 70 is disposed between the large gear 31a of the first stepped pinion 31 and the large gear 32a of the second stepped pinion 32 in the horizontal direction of the axle driving device 1.

Further, the support shaft 33c of the first outer pinion 33 is disposed on the outside of the support shaft 32c of the second stepped pinion 32 about the rotary shaft of the carrier 7.

As illustrated in FIGS. 6 and 9, the first stay 71 and the second stay 72, extended from the base plate 70, are arranged in the vicinity of the first outer pinion 33. The first outer pinion 33 is disposed between the first stay 71 and the second stay 72 in a turning direction of the side plate 9. The first outer pinion 33, the first stay 71, and the second stay 72 are arranged with an interval corresponding to a gear clearance of the first outer pinion 33.

The first outer pinion 33 meshes with internal teeth of the first ring gear 34 inside the first ring gear 34.

As illustrated in FIGS. 3 and 6, the first ring gear 34 is disposed on the side plate 9 side between the side plate 9 and the differential case 44. The large gear 31a of the first stepped pinion 31, the small gear 32b of the second stepped pinion 32, the sun gear 21, and the first outer pinion 33 are arranged inside the first ring gear 34.

The large gear 32a of the second stepped pinion 32 is offset with respect to the first ring gear 34 in the horizontal direction of the axle driving device 1. Further, as illustrated in FIGS. 4 and 8, the large gear 32a of the second stepped pinion 32 is offset with respect to the sun gear 21 in the horizontal direction of the axle driving device 1. It is configured that a tooth top of the large gear 32a passes through the inside of the tooth end of the sun gear 21 (the side of the large gear 32a which approaches a revolving axis).

The carrier 7 is rotatably configured around the motor driving shaft 2 as a rotary shaft. The first stepped pinion 31, the second stepped pinion 32, the first outer pinion 33, and the second outer pinion 36, which are supported by the carrier 7, can make a revolving motion with respect to the motor driving shaft 2.

When the first ring gear 34 is fixed to the axle driving device 1, the carrier 7 supporting the first outer pinion 33 turns by a driving force via the first outer pinion 33.

When the second ring gear 35 is fixed to the axle driving device 1, the carrier 7 turns by a driving force via the second outer pinion 36.

The carrier 7 is connected to the differential mechanism 4 by the differential case 44. The differential case 44 is made of the member in common with the carrier 7 and the differential mechanism 4. A driving force from the carrier 7 is thereby transmitted to the differential mechanism 4.

As illustrated in FIGS. 4 and 10, the differential mechanism 4 is made up of the differential case 44, the ring gear 43, a first pinion gear 41, a second pinion gear 42, a support plate 61, and the first axle 5. The rotating center of the differential case 44, the ring gear 43, and the support plate 61 coincides with the rotating center of the first axle 5.

The ring gear 43 is fixed to the differential case 44, and the first pinion gear 41, the second pinion gear 42, and a gear 51 of the first axle 5 are arranged inside the ring gear 43. The ring gear 43 is configured such that the engagement unit 12 is engageable therewith, and the ring gear 43 is fixable to the housing case 11 with the engagement unit 12.

As illustrated in FIG. 10, the ring gear 43 of the differential mechanism 4 meshes with the first pinion gear 41, and the first pinion gear 41 is rotatably supported by a support shaft 41c. The support shaft 41c of the first pinion gear 41 has its end held by the support plate 61 and an extension 61a extended from the support plate 61.

The first pinion gear 41 further meshes with the second pinion gear 42. Similarly to the first pinion gear 41, the second pinion gear 42 is rotatably held by a support shaft (not illustrated) held by the support plate 61 and the extension 61a. Rotary shafts of the first pinion gear 41 and the second pinion gear 42 are arranged in the horizontal direction of the axle driving device 1.

The second pinion gear 42 meshes with the gear 51 of the first axle 5.

Further, the second axle 6 is connected to the opposite side of the support plate 61 from the first axle 5.

The support plate 61 has the same rotary shaft as the second axle 6.

Hence a driving force is transmitted to the first axle 5 and the second axle 6 via the differential mechanism 4.

Next, the configuration of the carrier 7 will be described with reference to the sectional views of FIGS. 6 to 8 and the perspective view of FIG. 9.

The carrier 7 is formed by integral connection of the side plate 9 and the differential case 44 by the base plate 70. The side plate 9 has a disk shape and is on a plane orthogonal to the rotary shaft of the carrier 7, and the differential case 44 also has a similar shape. The base plate 70 has a plate-like portion on the plane orthogonal to the rotary shaft, and a plate-like portion extending in the direction of the rotary shaft.

As illustrated in FIG. 7, the base plate 70 is made up of an annular part 70*a*, an extension 70*b*, and a tip 70*e*.

The annular part 70*a* is annularly provided about the rotary shaft of the carrier 7 and connected with three extensions 70*b* extended outward from the annular part 70*a*.

The extensions 70*b* are arranged at equal intervals in a circumferential direction about the rotary shaft of the carrier 7. The tip 70*e* is provided on each extension 70*b* along the circumference about the rotary shaft of the carrier 7.

On the base plate 70, a J-shaped notch 70*c* is made up of the annular part 70*a*, the extension 70*b*, and the tip 70*e*. The small gear 32*b* of the second stepped pinion 32 is disposed in the notch 70*c*.

The extension 70*b* is provided with a circular arc part 70*d* depressed in an arc shape on the opposite side to the notch 70*c*, and small gear 31*b* of the first stepped pinion 31 is disposed.

In the annular part 70*a*, the fourth stay 74 and the fifth stay 75 are provided on the rotary shaft side of the carrier 7 so as to be orthogonal to the base plate 70.

Further, in the extension 70*b*, the third stay 73 is provided so as to be orthogonal to the base plate 70. The first stay 71, the second stay 72, and the sixth stay 77 are provided so as to be orthogonal to the base plate 70 at the tip 70*e*.

That is, the first stay 71, the second stay 72, the third stay 73, the fourth stay 74, the fifth stay 75, and the sixth stay 77 are extended from the base plate 70 in the horizontal direction of the axle driving device 1.

Three each of the first stays 71, the second stays 72, the third stays 73, the fourth stays 74, the fifth stays 75, and the sixth stays 77 are provided and disposed at equal intervals in the turning direction of the carrier 7.

The first stay 71, the second stay 72, the third stay 73, the fourth stay 74, the fifth stay 75, and the sixth stay 77 are extended from the edge of the base plate 70.

Therefore, the first stays 71, the second stays 72, the third stays 73, the fourth stays 74, the fifth stays 75, and the sixth stays 77 may be molded by folding a plate portion extending from the base plate 70 by press working. The side plate 9 and the differential case 44 may be configured by forging, and may be fixed to the base plate 70 by welding.

As illustrated in FIG. 6, the first stay 71, the second stay 72, and the fifth stay 75 are extended from the base plate 70 to the left side of the axle driving device 1, to fix the side plate 9 to the base plate 70. The first stay 71 and the second stay 72 are connected to the outer peripheral edge of the side plate 9.

Further, the first stay 71 and the second stay 72 are arranged on the outside of the support shaft 33*c* of the first outer pinion 33 (the side farther from the rotary shaft of the side plate 9). Note each of that the first stay 71 and the second stay 72 is formed in a shape along the outer peripheral edge of the side plate 9 and has a circular arc shape in the horizontal view of the axle driving device 1.

The fifth stay 75 is connected to the edge of an opening 92 of the side plate 9, and the motor driving shaft 2 is inserted into the opening 92. The fifth stay 75 is disposed so as to surround the outer peripheral surface of the sun gear 21 of the motor driving shaft 2.

The sun gear 21 meshes with the large gear 31*a* of the first stepped pinion 31 between the fifth stays 75.

As illustrated in FIG. 8, the third stay 73, the fourth stay 74, and the sixth stay 77 are extended from the portion orthogonal to the rotary shaft of the base plate 70 to the right side of the axle driving device 1, and fixes the differential case 44 to the base plate 70.

The differential case 44 is provided with an opening 44*b* in a circular shape, into which the first axle 5 is inserted, and the fourth stay 74 is connected around the opening 44*b*. Note that the fourth stay 74 is configured to have an arc shape in cross section along the shape of the edge of the opening 44*b*.

Further, the outer periphery of the large gear 32*a* of the second stepped pinion 32 is located between the fourth stays 74.

On the base plate 70, the third stay 73 is provided along a direction from the rotary shaft of the carrier 7 to the outside. On the surface orthogonal to the rotary shaft of the carrier 7, the third stay 73 has an arc shape protruding from the base plate 70 side in a cross section.

Further, the third stay 73 is disposed between the first stepped pinion 31 and the second stepped pinion 32.

On the base plate 70, the sixth stay 77 is provided along the direction from the rotary shaft of the carrier 7 to the outside. The sixth stays 77 are connected to the outer peripheral portion of the differential case 44. The small gear 31*b* of each first stepped pinion is disposed between the fourth stay 74 and the sixth stay 77.

Further, as illustrated in FIG. 2, the cover plate 8 is mounted on the side plate 9, and the first stepped pinion 31 is disposed on the opposite side of the side plate 9 from the cover plate 8.

The side plate 9 is provided with a rising part 96 extended in the direction of the rotary shaft along the motor driving shaft 2 on the rotary shaft side of the side plate 9. The rising part 96 is provided along the opening 92, and an annular oil passage 91*a* is provided outside the rising part 96. The annular oil passage 91*a* is annularly provided along the outside of the rising part 96 and formed by depressing the surface of the side plate 9 on the cover plate 8 side to the right side of the axle driving device 1.

The annular oil passage 91*a* is provided on the surface of the side plate 9 on the cover plate 8 side. As illustrated in FIGS. 3 to 5, oil passages 91*b*, 91*c*, 91*d*, 91*e* radially extending from the rotating center side of the side plate 9 are connected to the annular oil passage 91*a*. The oil passages 91*b*, 91*c*, 91*d*, 91*e* are connected to lubricating oil passages 31*d*, 32*d*, 33*d*, 36*d* provided inside the support shafts 31*c*, 32*c*, 33*c*, 36*c* of the planetary gear, respectively.

As illustrated in FIGS. 2 and 3, the cover plate 8 has an offset part 82 on the rising part 96 side, which is offset on the opposite side to the first stepped pinion 31. The offset part 82 is connected to an attachment part 83 that is attached to the side plate 9 via a connection part 84 inclined from the offset part 82 to the first stepped pinion 31 side.

In a state where the attachment part 83 of the cover plate 8 is attached to the side plate 9, the offset part 82 is held in a position not in contact with the side plate 9. As a result, an opening 85 is provided between the offset part 82 and the side plate 9.

The opening 85 is annularly provided around the rising part 96 of the side plate 9 and communicates with the annular oil passage 91a.

As illustrated in FIG. 3, the lubricating oil passage 31d is provided inside the support shaft 31c of the first stepped pinion 31, and the lubricating oil passage 31d is connected to the annular oil passage 91a via the oil passage 91c. Further, the lubricating oil passage 33d is provided inside the support shaft 33c of the first outer pinion 33, and the lubricating oil passage 33d is connected to the annular oil passage 91a via the oil passage 91b.

As illustrated in FIG. 4, the lubricating oil passage 32d is provided inside the support shaft 32c of the second stepped pinion 32, and the lubricating oil passage 32d is connected to the annular oil passage 91a via the oil passage 91d.

As illustrated in FIG. 5, the lubricating oil passage 36d is provided inside the support shaft 36c of the second outer pinion 36, and the lubricating oil passage 36d is connected to the annular oil passage 91a via the oil passage 91e.

The lubricating oil passages 31d, 32d, 33d, 36d provided in the support shafts 31c, 32c, 33c, 36c of the planetary gear are provided along the extending directions of the support shafts 31c, 32c, 33c, 36c where the respective passages are provided. Oil passages (not illustrated) are connected to the lubricating oil passages 31d, 32d, 33d, 36d in the support shafts 31c, 32c, 33c, 36c where the respective passages are provided. Then, lubricating oil can be supplied between each of the support shafts 31c, 32c, 33c, 36c and each of the first stepped pinion 31, the second stepped pinion 32, the first outer pinion 33, and the second outer pinion 36 which are the planetary gears.

Note that a sliding bearing or a rolling bearing can be provided between each of the first stepped pinion 31, the second stepped pinion 32, the first outer pinion 33, the second outer pinion 36, and each of the support shafts 31c, 32c, 33c, 36c.

In the above configuration, enough lubricating oil can be supplied to each of the support shafts 31c, 32c, 33c, 36c, so that the first stepped pinion 31 can be supported via the sliding bearing mounted on the support shaft 31c. Further, a needle bearing may be disposed in a middle part of the support shaft 31c to rotatably support the first stepped pinion 31.

Note that the second stepped pinion 32, the first outer pinion 33, and the second outer pinion 36 which are the other planetary gears, can also be supported in the same manner as above.

Further, in the above configuration, as the engagement unit 12, a dog clutch or the like provided movably in the direction of the rotary shaft of the second ring gear 35 can be used in the housing case 11. By taking the position selection unit 12a as one actuator and driving the dog clutch, the dog clutch can be moved for shift transmission and parking by using one actuator.

Note that each of the first ring gear 34, the second ring gear 35, and the ring gear 43 can be individually provided with the engagement unit 12 and individually fixed to the housing case 11.

Next, the function of the axle driving device 1 of the present disclosure will be described.

When the electric motor (not illustrated) installed inside the case of the axle driving device 1 is activated, a rotor of the electric motor is driven. The motor driving shaft 2 is attached to the rotor of the electric motor, and the motor driving shaft 2 is driven.

When a driving force is transmitted by the motor driving shaft 2, the first stepped pinion 31 is driven by the sun gear 21 fixed to the motor driving shaft 2. The first stepped pinion 31 transmits the driving force to the second stepped pinion 32 by using the small gear 31b. Since the driving force input into the large gear 31a is transmitted from the small gear 31b, the driving force is decelerated in the first stepped pinion 31.

Thereafter, the transmission channel of the driving force can be changed by the position of the engagement unit 12, to change the deceleration ratio.

When the engagement unit 12 is positioned at the position Hi by the position selection unit 12a, the driving force is transmitted to the second ring gear 35 via the second outer pinion 36 meshing with the large gear 32a of the second stepped pinion 32. With the second ring gear 35 being fixed to the housing case 11 by the engagement unit 12, the second outer pinion 36 makes a revolving motion along the second ring gear 35. Thereby, the carrier 7 supporting the second outer pinion 36 is driven, and the driving force is transmitted to the differential mechanism 4.

Since the first ring gear 34 is not fixed to the housing case 11, the first ring gear 34 spins out.

That is, when the engagement unit 12 is positioned at the position Hi, the driving force is decelerated between the sun gear 21 and the large gear 31a of the first stepped pinion 31 and between the small gear 31b of the first stepped pinion 31 and the second ring gear 35.

When the engagement unit 12 is positioned at the position Lo, the first ring gear 34 is fixed to the housing case 11, and the second ring gear 35 is not fixed to the housing case 11.

The driving force of the first stepped pinion 31 is transmitted to the large gear 32a of the second stepped pinion 32, and the driving force is decelerated in the second stepped pinion 32.

The driving force is then transmitted from the small gear 32b of the second stepped pinion 32 to the first outer pinion 33.

With the first ring gear 34 being fixed by the engagement unit 12, the first outer pinion 33 makes a revolving motion along the first ring gear 34.

Thereby, the carrier 7 supporting the first outer pinion 33 is driven, and the driving force is transmitted to the differential mechanism 4.

That is, when the engagement unit 12 is positioned at the position Lo, the driving force is decelerated between the sun gear 21 and the large gear 31a, between the small gear 31b and the large gear 32a, and between the small gear 32b and the first ring gear 34.

In the driving-force transmission channel in the above case where the engagement unit 12 is positioned at the position Lo, the first stepped pinion 31 and the second stepped pinion 32 are connected in series to decelerate the driving force. The small gear 32b of the second stepped pinion 32 is disposed on the large gear 31a side of the first stepped pinion 31 in the planet gear mechanism 3, and the large gear 32a is disposed on the small gear 31b side.

Thereby, the driving force is transmitted by the first stepped pinion 31 to the small gear 31b side which is on the right side of the axle driving device 1, and the driving force is transmitted by the second stepped pinion 32 to the small gear 32b side which is the left side of the axle driving device 1.

Hence it is possible to fold back the driving force in the extending directions of the support shaft 31c and the support shaft 32c by using the first stepped pinion 31 and the second stepped pinion 32 which are a plurality of stepped gears in the planet gear mechanism 3. The deceleration channel for decelerating the driving force is folded back in the horizontal direction of the axle driving device 1, and a large deceleration ratio can thus be obtained while a small space is in use.

As thus described, the deceleration ratio of the axle driving device 1 can be selected by the position of the engagement unit 12. When the engagement unit 12 is positioned at the position Hi, the deceleration ratio of the axle driving device 1 is small and a high turning speed can be obtained. When the engagement unit 12 is positioned at the position Lo, the deceleration ratio of the axle driving device 1 is large and high torque can be obtained.

When the engagement unit 12 is positioned at the position Hi or the position Lo, the driving force is transmitted to the carrier 7, and a driving force is transmitted to the differential mechanism 4.

The differential case 44 is rotated by rotation of the carrier 7, and the ring gear 43 integrally provided with the differential case 44 rotates.

The driving force of the ring gear 43 is transmitted to the support plate 61 via the first pinion gear 41 and transmitted to the gear 51 via the second pinion gear 42.

Hence a driving force, input into the differential case 44, is transmitted to each of the first axle 5 and the second axle 6 via the differential mechanism 4.

However, when the engagement unit 12 is positioned at the position P by the position selection unit 12a, the ring gear 43 is fixed to the housing case 11. As a result, the carrier 7 is fixed to the housing case 11, and the driving force from the motor driving shaft 2 is not transmitted to the differential mechanism 4.

When the engagement unit 12 is positioned at the position P, the first ring gear 34 and the second ring gear 35 are not fixed to the housing case 11. Hence the first ring gear 34 and the second ring gear 35 spin out.

In the planet gear mechanism 3 described above, each of the first stepped pinion 31 and the second stepped pinion 32 can be efficiently arranged in the limited space.

The small gear 32b of the second stepped pinion 32 downstream of the driving-force channel is connected to the first ring gear 34 via the first outer pinion 33. By the connection via the first outer pinion 33, the flexibility in placement of the second stepped pinion 32 increases, and it is possible to increase the deceleration ratio by making the diameter of the second stepped pinion 32 larger.

In addition, it is possible to increase the deceleration ratio of the planet gear mechanism 3 by making the first ring gear 34 larger.

Since the large gear 32a of the second stepped pinion 32 is offset with the sun gear 21 of the motor driving shaft 2, the second stepped pinion 32 can be disposed on the inside of the rotary shaft of the planet gear mechanism 3. Further, it is possible to increase the large gear 32a and achieve the planet gear mechanism 3 with a high deceleration ratio.

Since the support shaft 33c of the first outer pinion 33 is disposed on the outside of the support shaft 32c of the second stepped pinion 32, the second stepped pinion 32 can be disposed closer to the rotary shaft side of the planet gear mechanism 3. Hence the moment generated during rotation of the planet gear mechanism 3 can be reduced. Further, the vibration that occurs during rotation of the carrier 7 can be reduced.

As illustrated in FIG. 3, both ends of the support shaft 31c are fixed to the carrier 7, and the first stepped pinion 31 is rotatably inserted and fitted into the support shaft 31c. As a result, even when the first stepped pinion 31 rotates itself, the support shaft 31c does not rotate itself. With the support shaft 31c not rotating itself, the support shaft 31c is not included in the mass of the first stepped pinion 31 when the first stepped pinion 31 rotates itself. The turning moment of the first stepped pinion 31 can thus be kept low.

Further, since the lubricating oil passage 31d is provided inside the support shaft 31c, the mass of the support shaft 31c is reduced, and the turning moment is lowered at the time of revolution of the support shaft 31c.

The other support shafts 32c, 33c, 36c have similar configuration to that of the support shaft 31c, thereby reducing the mass in the planet gear mechanism 3 and reducing the turning moment of each planet gear. It is thereby possible to reduce a load applied to the carrier 7 when turned and reduce distortion generated in the carrier 7. Then, deviation in placement of the planet gear in the carrier 7 is reduced, and the generation of noise is reduced.

Further, noise is reduced by the first ring gear 34 and the second ring gear 35.

The sun gear 21, the first stepped pinion 31, the second stepped pinion 32, the first outer pinion 33, and the second outer pinion 36 are arranged inside the first ring gear 34 and the second ring gear 35. That is, in the planet gear mechanism 3, a portion where the gears mesh each other is covered by the first ring gear 34 and the second ring gear 35 to reduce noise in the direction orthogonal to the rotary shaft.

Further, since the large gear 31a of the first stepped pinion 31 is meshed with the sun gear 21, a large deceleration ratio is set on the upstream side of the driving-force transmission channel to reduce the turning speed of the carrier 7. This lowers the turning speed of the carrier 7 and lowers a frequency of generated vibration. It is thereby possible to reduce a high frequency component in vibration generated by the operation of the axle driving device 1.

Further, since the first ring gear 34 and the second ring gear 35 are disposed adjacent to each other, the distance by which the engagement unit 12 moves is short. Hence it is possible to shorten the distance, by which the actuator for driving the engagement unit 12 is driven, and compactly constitute the axle driving device 1 including the engagement unit 12.

Further, the two-speed variable axle driving device 1 can be compactly configured at a deceleration ratio of about 20.

Note that engagement unit 12 can be configured in a simple shape by making uniform the outer diameters of the first ring gear 34 and the second ring gear 35.

Further, on the base plate 70, a space opened to the outer side with respect to the rotary shaft is provided between the tips 70e, and the first stepped pinion 31 and the second stepped pinion 32 are arranged. As a result, the first stepped pinion 31 and the second stepped pinion 32 can be assembled from the outside by using the space between the tips 70e.

The small gear 31b of the first stepped pinion 31 and the second outer pinion 36 are arranged on the opposite side to the shaft center of the large gear 32a of the second stepped pinion 32. Hence a part of an influence due to meshing between the large gear 32a and the small gear 31b can be canceled by meshing between the second outer pinion 36 and the large gear 32a. It is thus possible to reduce torsion of the second stepped pinion 32 and reduce noise due to meshing of the large gear 32a.

The second outer pinion 36 is disposed in a position where the second outer pinion 36 overlaps with the large gear 31a between the first stepped pinion 31 and the second stepped pinion 32 in a horizontal view of the axle driving device 1. Thus, the second outer pinion 36 is disposed using the space between the gears in the planet gear mechanism 3, so that it is possible to compactly constitute the planet gear mechanism 3.

In the embodiment of the present disclosure, it is also possible to connect a plurality of planet gear mechanisms 3 for deceleration. For example, the carrier 7 is not connected to the differential mechanism 4, but the sun gear that rotates integrally with the carrier 7 is provided on the differential mechanism 4 side of the carrier 7. The first stepped pinion 31 of the planet gear mechanism 3 is then connected to this sun gear, whereby a driving force can be decelerated using two planet gear mechanisms 3.

It is possible to constitute the axle driving device 1 including four ring gears and being four-speed variable.

Next, lubrication and cooling of the planet gear mechanism 3 will be described.

By rotation of the carrier 7, lubricating oil stored in the axle driving device 1 is splashed. The lubricating oil having been splashed and reached the opening 85 flows into the annular oil passage 91a. The oil flows into each of the oil passage 91b, the oil passage 91c, the oil passage 91d, and the oil passage 91e by a centrifugal force generated due to turning of the carrier 7.

Note that the lubricating oil having flown in from the opening 85 flows out to nowhere other than each of the oil passage 91b, the oil passage 91c, the oil passage 91d, and the oil passage 91e, and the lubricating oil is then supplied to each of the lubricating oil passage 33d, the lubricating oil passage 31d, the lubricating oil passage 32d, and the lubricating oil passage 36d. By reliably supplying lubricating oil to the gear from the inside of the support shaft, it is possible to obtain lubrication and cool the gear with lubricating oil.

Accordingly, by the simply structure formed of the oil passages provided by the surface shape of the side plate 9 and the cover plate 8, a lubrication mechanism of the planet gear mechanism 3 can be configured. It is possible to reliably supply lubricating oil to the first stepped pinion 31, the second stepped pinion 32, the first outer pinion 33, and the second outer pinion 36 of the planet gear mechanism 3. Lubricating oil for lubrication and cooling is reliably supplied, and cooling is performed with the lubricating oil. Therefore, even in the complex planet gear mechanism 3, it is possible to prevent overheating and expansion of the first stepped pinion 31, the second stepped pinion 32, the first outer pinion 33, and the second outer pinion 36.

Further, lubricating oil is supplied to the support shaft 33c of the first outer pinion 33 by the oil passage 91b linearly provided from the vicinity of the rotary shaft of the side plate 9 that is the support member of the support shaft 33c. In the same manner, lubricating oil is also supplied to the support shaft 36c of the second outer pinion 36 by the oil passage 91e. It is thus possible to shorten the supply channel of lubricating oil and reliably supply the lubricating oil.

Moreover, removing the cover plate 8 can facilitate maintenance of the annular oil passage 91a, the oil passage 91b, the oil passage 91c, and the oil passage 91d.

As described above, according to the embodiment to which the present disclosure is applied, the axle driving device includes the planet gear mechanism 3 that transmits a driving force to the first axle 5 (first axle) and the second axle 6 (second axle) via the differential mechanism 4. The planet gear mechanism 3 includes the first outer pinions 33 (first planetary gears), the second outer pinions 36 (second planetary gears), the first stepped pinions 31 (first stepped gears), and the second stepped pinions 32 (second stepped gears). Each of the first stepped pinion 31 and the second stepped pinion 32 is formed of a planetary gear where a large gear and a small gear are integrally provided. A driving force is input into the large gears 31a (larger gears) of the first stepped pinions 31. Further, the small gears 31b (smaller gears) of the first stepped pinions 31 are meshed with the large gears 32a (larger gears) of the second stepped pinions 32. The small gears 32b (smaller gears) of the second stepped pinions 32 are connected to the first ring gears 34 (first internal gears) via the first outer pinions 33. The large gears 32a of the second stepped pinions 32 are connected to the second ring gears 35 (second internal gears) via the second outer pinions 36.

With such a configuration, the second stepped pinions 32, each of which is formed by integrally combining two gears with each other, are used and hence, the number of parts in the planet gear mechanism 3 is reduced, thus improving ease of assembly. Further, the second stepped pinions 32 are used, and each second stepped pinion 32 is formed by integrally combining two gears with each other, thus having improved torsional rigidity. Accordingly, the second stepped pinion 32 is prevented from being easily deformed so that noise is reduced.

The first outer pinions 33 and the second outer pinions 36 are disposed according to the positions of the second stepped pinions 32 and, then, the first ring gear 34 and the second ring gear 35 are connected. With such a configuration, the degree of freedom in disposing the second stepped pinions 32 is improved.

Further, fixing either of the first ring gear 34 or the second ring gear 35 allows a deceleration ratio to be selectively changed. With such a configuration, it is possible to form the axle driving device 1 which has a compact configuration, and which can change a deceleration ratio.

Further, the small gears 32b of the second stepped pinions 32 are connected to the first ring gears 34 via the first outer pinions 33 and hence, a deceleration ratio of the planet gear mechanism 3 can be improved by increasing the diameter of the first ring gear 34. In the same manner, the large gears 32a of the second stepped pinions 32 are connected to the second ring gears 35 via the second outer pinions 36 and hence, a deceleration ratio of the planet gear mechanism 3 can be improved.

The small gear 32b of each second stepped pinion 32 is disposed on the large gear 31a side (larger gear side) of the first stepped pinion 31 so as to cause the transmission of a driving force to turn back in the direction of the rotary shaft.

With such a configuration, the axle driving device 1 can be formed with a short length in the extending direction of the first axle 5. At the same time, using two kinds of stepped pinions (31, 32) allows a high deceleration ratio to be obtained.

The axle driving device 1 further includes the engagement unit 12. The engagement unit 12 is selectively engaged with the first ring gear 34 or the second ring gear 35 so as to fix the first ring gear 34 or the second ring gear 35 to the body of the axle driving device 1 (axle driving device body).

With such a configuration, the deceleration ratio of the planet gear mechanism can be selectively changed by the engagement unit 12. It is possible to provide a two-speed variable axle driving device 1 which has a compact configuration.

Further, the side plate 9 supports the support shaft 33c of each first outer pinion 33 of the planet gear mechanism 3 and the support shaft 36c of each second outer pinion 36 of the planet gear mechanism 3. The annular oil passage 91a, the oil passage 91b, and the oil passage 91e are provided to the side plate 9. The annular oil passage 91a, the oil passage 91b, and the oil passage 91e are provided to the side plate 9 on the side opposite to the side where the first outer pinions 33 and the second outer pinions 36 are disposed. The oil passage 91b and the lubricating oil passage 33d in each support shaft 33c are connected with each other. Further, the oil passage 91e and the lubricating oil passage 36d in each support shaft 36c are connected with each other.

With such a configuration, lubricating oil can be supplied to the first outer pinions 33 and the second outer pinions 36 with the simple configuration. The lubricating oil can cool the first outer pinions 33 and the second outer pinions 36 and hence, it is possible to suppress the reduction of assembly accuracy caused by thermal expansion, thus reducing noise. Further, the lubricating oil is introduced into the support shafts 33c and hence, the lubricating oil can be easily supplied to the first outer pinions 33. In the same manner, the lubricating oil can be easily supplied to the second outer pinions 36.

The embodiment described above only shows one aspect of the present disclosure and can be arbitrarily modified or applied in the scope not deviating from the gist of the present disclosure.

REFERENCE SIGNS LIST

1 Axle driving device
2 Motor driving shaft
3 Planet gear mechanism
4 Differential mechanism
5 First axle
6 Second axle
7 Carrier
9 Side plate
11 Housing case
31 First stepped pinion
31a Large gear
31b Small gear
32 Second stepped pinion
32a Large gear
32b Small gear
33 First outer pinion
34 First ring gear
35 Second ring gear
36 Second outer pinion
44 Differential case

What is claimed is:

1. An axle driving device comprising a planet gear mechanism configured to transmit a driving force to a first axle and a second axle via a differential mechanism, wherein
the planet gear mechanism includes a first planetary gear, a second planetary gear, a first stepped gear, and a second stepped gear, each of the first stepped gear and the second stepped gear being formed of a planetary gear where a larger gear and a smaller gear are integrally provided,
a driving force is input into the larger gear of the first stepped gear,
the smaller gear of the first stepped gear is meshed with the larger gear of the second stepped gear,
the smaller gear of the second stepped gear is connected to a first internal gear via the first planetary gear, and
the larger gear of the second stepped gear is connected to a second internal gear via the second planetary gear.

2. The axle driving device according to claim 1, wherein in an axial direction of the second stepped gear, the smaller gear of the second stepped gear is disposed on a side of the larger gear of the first stepped gear.

3. The axle driving device according to claim 2, further comprising a clutch configured to be selectively engaged with the first internal gear or the second internal gear, thus fixing the first internal gear or the second internal gear to an axle driving device body.

4. The axle driving device according to claim 3, wherein
an oil passage is provided to a support member which holds support shafts respectively supporting the first planetary gear, the second planetary gear, the first stepped gear, and the second stepped gear,
the oil passage is provided on a side opposite to a side where the support shafts are disposed, and
the oil passage of the support member and an oil passage in each of the support shafts are connected with each other.

5. The axle driving device according to claim 2, wherein
an oil passage is provided to a support member which holds support shafts respectively supporting the first planetary gear, the second planetary gear, the first stepped gear, and the second stepped gear,
the oil passage is provided on a side opposite to a side where the support shafts are disposed, and
the oil passage of the support member and an oil passage in each of the support shafts are connected with each other.

6. The axle driving device according to claim 1, further comprising a clutch configured to be selectively engaged with the first internal gear or the second internal gear, thus fixing the first internal gear or the second internal gear to an axle driving device body.

7. The axle driving device according to claim 6, wherein
an oil passage is provided to a support member which holds support shafts respectively supporting the first planetary gear, the second planetary gear, the first stepped gear, and the second stepped gear,
the oil passage is provided on a side opposite to a side where the support shafts are disposed, and
the oil passage of the support member and an oil passage in each of the support shafts are connected with each other.

8. The axle driving device according to claim 1, wherein
an oil passage is provided to a support member which holds support shafts respectively supporting the first planetary gear, the second planetary gear, the first stepped gear, and the second stepped gear,
the oil passage is provided on a side opposite to a side where the support shafts are disposed, and
the oil passage of the support member and an oil passage in each of the support shafts are connected with each other.

* * * * *